Jan. 13, 1959
W. G. HEGMANN
2,868,351
MATERIAL THROWER OR IMPACTOR
Filed March 28, 1955
3 Sheets-Sheet 1
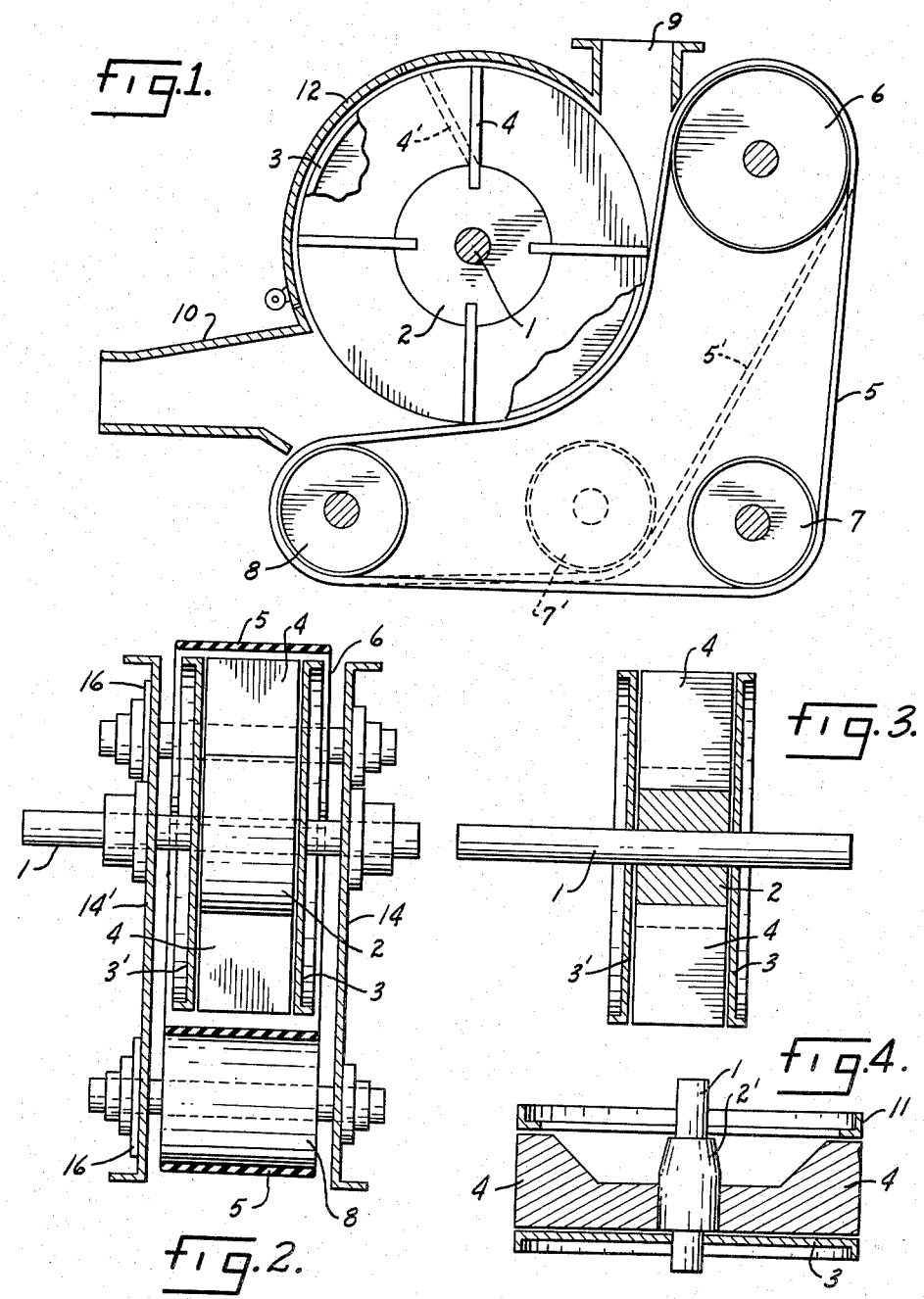
INVENTOR.
William George Hegmann,
BY Parker & Carter
Attorneys.

Jan. 13, 1959
W. G. HEGMANN
2,868,351
MATERIAL THROWER OR IMPACTOR
Filed March 28, 1955
3 Sheets-Sheet 2
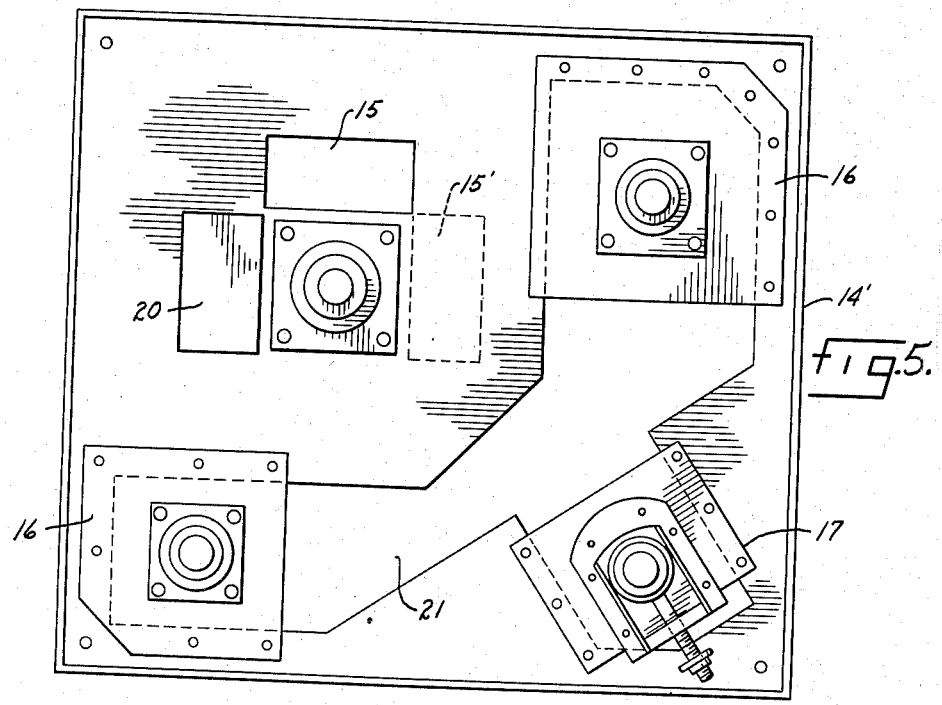
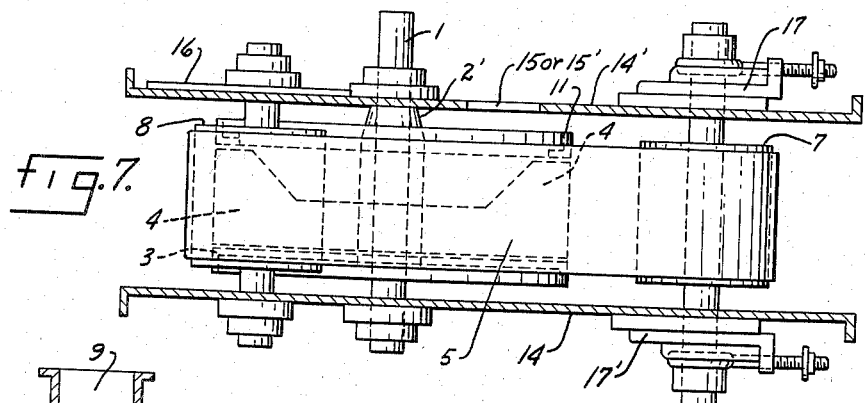
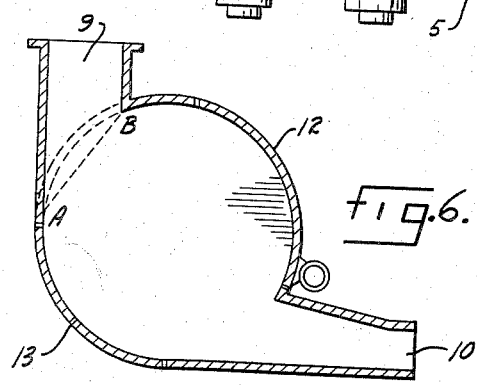
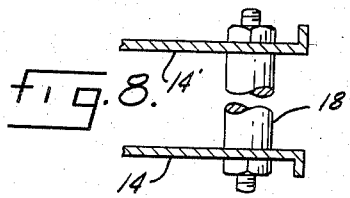
INVENTOR.
William George Hegmann,
BY
Parker & Carter
Attorneys.

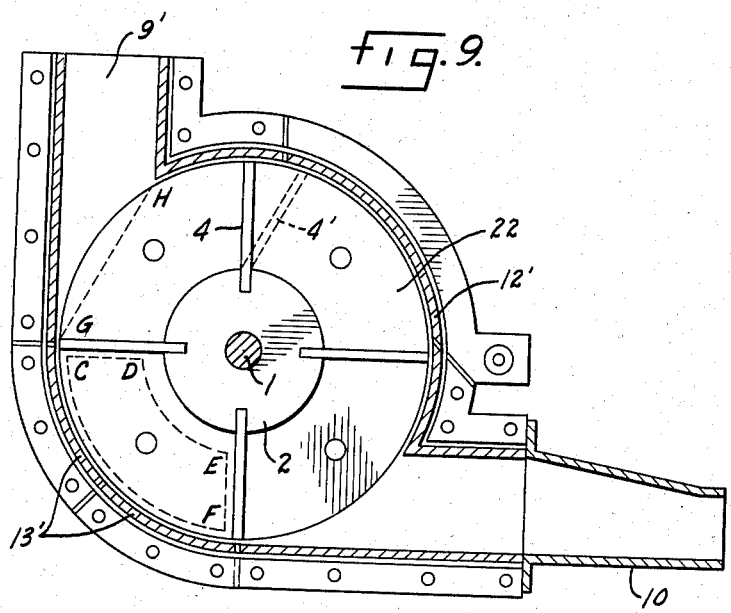
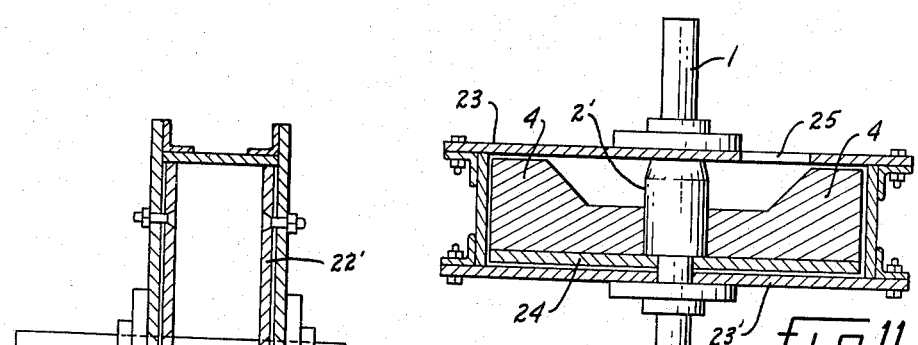
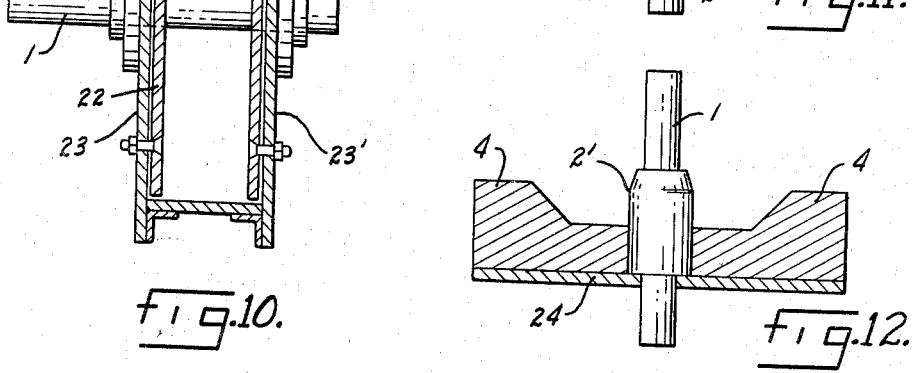

United States Patent Office 2,868,351
Patented Jan. 13, 1959

2,868,351

MATERIAL THROWER OR IMPACTOR

William George Hegmann, Fort Smith, Ark.

Application March 28, 1955, Serial No. 497,111

6 Claims. (Cl. 198—128)

The invention hereinafter to be known as a material thrower or impactor is an apparatus so constructed as to throw, propel, or convey materials from a point of reception to a predetermined point or location thereon, and further to direct the flow of said thrown, propelled, or conveyed material in such a manner as to fill or occupy the whole of, the cubic capacity of containers, vessels, forms or bins with the thrown, propelled, or conveyed material and aims primarily to effect uniform filling or packing of containers, vessels, forms or bins, heretofore, in some instances, arduously accomplished by hand labor. The invention has particular application to a charging mechanism for retorts in which the charging materials must be effectively mixed and compacted as they are fed.

To summarize the principle of operation, the material is presented to a blade or blades rotating around a common axis, incompassed in a circular casement or housing, the inner circumferential surface of which is in close proximity to the extreme outer peripheral travel of the end of blade or blades and portions of said material are momentarily impinged on the front side of blade or blades and subsequently centrifugally directed to their outer path of travel and to the inner surface of housing wall where the material is formed into a compact mass, which is thrown or impelled by the impact from the rotating blade or blades, out and through an opening in the casement or housing which may be located at any desired point on the circumference of said casement or housing which, in relation to the feed point, will provide the required compacting into individual packed masses or lumps of material. When blade or blades are rotating in a vertical plane then two openings are essential in casement or housing, one for material entrance and one for discharge, however when blade or blades are rotating in a horizontal plane then only one opening is necessary in the casement or housing, same being for discharge purposes, since the material is presented to the blade or blades, through an opening in the top cover plate or roof of casement or housing, at right angles to the path of travel of rotating blade or blades.

The opening in the top cover plate or roof of housing may be located at any radius (see Figure 5) from the common axis of the rotor assembly, as at opening noted as 15' or extending counter clockwise as at opening noted as 15 and it is the position of this opening that governs the length of peripheral travel of the material and resultant impact.

With the foregoing in view, the invention resides in the novel subject matter hereinafter described and claimed, description being accomplished by reference to the accompanying drawings.

Figures 1 and 2 are cross sectional views of the apparatus when operating in a vertical position, however the various parts are located substantially the same when operating in a horizontal position. Part 1 is a shaft to which the driving or power unit is attached either by direct connecting, pulley and belt arrangement or by suitable bevel gearing. Surrounding shaft 1 is hub 2 keywayed and set screwed to said shaft and attached to hub 2 are blade 4 or 4' or blades 4 or 4'. Four blades are shown in Figure 1 although any number maybe used and in case only one blade comprises the total then a counterweight placed radially opposite the single blade is necessary. The number of blades, their rotating speed and the rate of the feed material with reference to volume fed per revolution of the rotor assembly, govern the velocity and distance material is thrown, propelled or conveyed. 4' and indicated by dotted lines, Figure 1, is merely a blade or blades positioned at a different angle from a radial line from hub 2 or 2' and will be designated hereinafter as a bent curved or angle blade.

The rotor assembly, Figure 3, is a structure comprising shaft 1, hub 2, discs 3 and 3' and blades 4. This entire unit positioned as shown in Figure 1 has a front housing 12, part of which is hinged as shown to permit access to inner parts, connecting with upper cover of nozzle 10 and extending perimetrically to front plate of opening 9. From lower end of back plate of opening 9 an endless belt 5 or 5' comprises the back housing and encircles half the circumference of pulleys 6 and 8, approximately one-fourth the circumference of pulley 7 or 7' and in turn contacts approximately one-fourth of the circumference of discs 3 and 3' when operating in a vertical position or rim 11 (see Figure 4) and disc 3 if operating in a horizontal position.

Figure 6 (reduced scale) is a structure wherein the endless belt 5 is replaced by a steel or metal alloy housing 13 extending from lower end of back wall of opening 9 perimetrically to a point where lower plate of nozzle 10 continues as a straight horizontal plane. If operating in a horizontal position, arc opposite chord AB, noted by dotted lines is closed with an arc segment of the same radius as housing 12 and 13. The latter design may be used when materials of minor abrasive character is being handled and further simplifying the operation, and endless belt 5, pulleys 6, 7 and 8 become inoperative by reducing the tension of endless belt 5 by means of the take up bearings attached to pulley 7.

In the foregoing, reference has been made to endless belt 5' and pulley 7' and is noted in Figure 1. Pulley 7' is shown to designate another location of pulley 7 and endless belt 5' is shown to indicate the path of travel of same in the event pulley 7 is positioned other than shown.

When the apparatus is operating in a horizontal position a rotor assembly as noted in Figure 4 is used. This structure comprises a shaft 1, hub 2', rim 11, disc 3 and blades 4. The blades in this construction extend from hub 2' to extreme outer edge of rim 11 and disc 3 and that portion of blade extending away from hub 2' for approximately one-half the blade length is of lesser height than the extreme end.

Figure 5 is a view of side 14' when operating in a vertical position or top cover plate when operating horizontally and also shows removable bearing plates 16, removable plate 17 to which is attached any conventional type take up bearings, material feed openings 15 or 15' and observation plate 20. Figure 5 further shows a cut out portion or opening 21 in top cover plate 14' and after removing bearing plates 16 and 17, changing endless belt 5 may easily be accomplished through this opening.

Figure 7 is a cross sectional view of the apparatus when operating in a horizontal position with reference to the arrangement of pulleys 7 and 8, endless belt 5, rotor assembly as shown in Figure 4, upper and lower removable plates 17 and 17' with take up bearing attachment, top cover plate 14' with material feed opening 15 or 15' and bottom plate 14. In this position the material is caused to drop through opening 15 or 15' where it is momentarily impinged on front side of blade or blades 4, centrifugally directed to their outer periphery of travel and to inner surface of casement or housing, which may be a stationary continuous walled circular surface previously described and noted in Figure 6 or may be a continuous walled surface traveling in the same direction as discharged material and comprising endless belt 5 as shown in Figure 1.

Figure 8 is a view showing spacer bolt 18, four to six of these bolts and preferably four located between parts 14 and 14' at their four respective corners serve to equally space parts 14 and 14' apart and to lend rigid and accurate alignment.

Figure 9 is a cross sectional view of an apparatus operating in a vertical position, performing the same function as described before and comprising a shaft 1, hub 2 with blade or blades 4 attached to said hub and rotating within a flanged circular walled, encasement on housing. The encasement or housing has a feet opening noted at 9' and a discharge orifice to which nozzle 10 is attached. Bolted or otherwise attached to flanged housing are sides 23 and 23' (see Figure 10) which also supports the bearings for shaft 1. Circular side liner discs 22 and 22' are attached to inner surface of sides 23 and 23' by means of countersunk bolts and countersunk holes in side liners 22 and 22' are drilled, radially and perimetrically, equidistant from a common center so as to permit rotating side liners 22 and 22', clockwise or counter clockwise, 45 degrees or more.

To further illustrate the purpose of this side liner construction and the necessity for changing positions of same as mentioned above, we picture the apparatus (Figure 9) as the face of a clock. The feed opening 9' corresponds to the circumferential distance from approximately 11 o'clock, counter clockwise to the 9 o'clock position. The material falling through this opening is picked up by the rotating blade or blades 4, momentarily impinged against their front side and centrifugally directed to the inner surface of housing wall, noted as arc segments 13' or the circumferential distance from the 9 o'clock position, counter clockwise to the 6 o'clock position.

Since the greatest impact and subsequent abrasion is experienced in the latter named area the inner surface of arc segments 13' and the area sector of the side liners, noted by dotted lines CDEF, wear away to such an extent that arc segments 13' must be replaced and were it not that side liners 22 and 22' are so constructed to permit rotating, so as to present a new surface at the area sector CDEF, each time the liners are moved 45 degrees, they too would require replacement. With the liner construction as outlined above four wearing surfaces are available before entire liner discs are discorded.

Figure 11 is a cross sectional view of an apparatus operating in a horizontal position and incorporates practically the same construction, with reference to flanged encasement or housing and sides 23 and 23' except that opening, opposite chord GH, is closed with a flanged arc segment of the same radius as housing 12' and 13'.

In this structure side liners 22 and 22' are eliminated and rotor assembly comprises shaft 1, hub 2' and attached to hub 2' are blade or blades 4 and disc 24. The top cover plate and corresponding to side 23, when operating in a vertical position, has an opening noted as 25 and this opening may be located at any radius from the common axis of the rotor assembly counter clockwise from the discharge orifice.

Figure 12 is a cross sectional view of the rotor assembly comprising shaft 1, hub 2', blades 4 and disc 24 and corresponds to the construction of the rotor assembly as noted in Figure 11.

I claim:

1. A charging mechanism for zinc retorts and the like, comprising a housing having side walls and a circumferential wall extending between said side walls, a material feed opening in said housing, a material discharge opening in said housing of substantially the same diameter as that of said feed opening, said openings being positioned to feed material and to discharge material in paths substantially perpendicular one to the other, an impactor member rotatably mounted in said housing, said member comprising a central rotatable hub, a plurality of laterally disposed blade members of a width substantially equal to the space between said sidewalls and extending from said hub outwardly to a point closely adjacent the circumferential wall of said housing, said blade members being rotatable through an arc drawn between said feed and discharge openings to receive material from said feed opening and to convey said material through an arc of approximately 90° along said circumferential wall and to deliver said material, in response to rotation of said impact member, to and through said discharge opening, said feed and discharge openings having widths substantially equal to that of the material-impacting portion of said blade members.

2. In a feed mechanism for zinc retorts, a housing having side walls joined by a generally circumferential side wall, a feed opening in said housing, a discharge opening in said circumferential wall at a point spaced at least 90° thereon from said feed opening, a discharge duct communicating with said discharge opening and positioned tangentially of said circumferential wall and means in said housing for moving material fed through said feed opening through an arc of 90° along said circumferential wall and discharging said material through said discharge opening, said last named means comprising a central hub rotatably mounted in said housing and means for rotating it, said hub having a plurality of radially disposed blade members connected thereto and radially extending to a point adjacent said circumferential wall said hub and blades laterally extending from one of said sidewalls to the other within said housing.

3. In a material impactor, a hub and means for rotating it, a plurality of blades secured to said hub and rotatable therewith, a disc secured to said hub and blades and rotatable therewith, a pair of spaced side walls enclosing said disc and blades, a feed duct communicating with said disc and blades in a path tangential therewith, a discharge duct communicating with said disc and blades in a path tangential therewith, the axis of said discharge duct being perpendicular to that of said feed duct, a curved end wall joining said side walls and extending from said discharge duct to said feed duct on one side of said hub and a continuous belt having a portion movable between said side walls on the opposite side of said hub, said portion extending from said feed opening to said discharge opening and forming portions of said feed duct and said discharge duct, said belt portion being in frictional contact with said disc and the outer edge of each of said blades between said feed and discharge opening and movable in response to rotation of said disc, said belt, as it moves between said side walls, forming a movable end wall between said discs.

4. In a material impactor, a substantially cylindrical housing having a pair of spaced sidewalls and a circumferential wall extending between said sidewalls, a feed opening in said housing, a discharge opening in said circumferential wall positioned substantially 90° from said feed opening, a hub rotatably mounted between said sidewalls, a plurality of blades on said hub and rotatable therewith within said housing to convey material fed through said feed opening through an arcuate path of approximately 90° to discharge material through said discharge opening and a liner removably mounted on the inner surface of at least one of said sidewalls and shielding said sidewall from contact by said material said liner constituting a plate member removably secured to the inner surface of said sidewall by means permitting periodic rotation of said liner to interchange a worn with an unworn portion thereof.

5. In a material impactor, a housing, a shaft rotatably mounted in said housing, a plurality of blade members rotatable with said shaft within said housing, a disc rotatable wtih said shaft and blades and positioned in a plane perpendicular to that of said blades, a continuous belt surrounding at least a pair of pulley members, a portion of said belt being in frictional contact with said disc between said pulley members, a feed duct positioned to deliver material tangentially to said disc and blades at the point of contact of said belt and disc, a discharge duct positioned to receive material from said disc and blades at the point of separation of said belt and disc, and means for unitarily rotating said shaft, disc and blades, said belt being movable in response to rotation of said disc.

6. The structure of claim 5, wherein said blades extend to the outer edge of said disc and are brought into frictional engagement with said belt as said blades traverse the portion of their path between said feed and discharge ducts.

References Cited in the file of this patent

UNITED STATES PATENTS

| | | |
|---|---|---|
| 793,773 | Eitle | July 4, 1905 |
| 813,022 | Queneau | Feb. 20, 1906 |
| 1,089,304 | Battaille et al. | Mar. 3, 1914 |
| 1,551,971 | Shipton | Sept. 1, 1925 |
| 1,561,588 | Bates | Nov. 17, 1925 |
| 1,576,366 | Schieldrop | Mar. 9, 1926 |
| 1,960,859 | Wright | May 29, 1934 |
| 2,119,648 | Piper | June 7, 1938 |
| 2,622,722 | Lucas | Dec. 23, 1952 |

FOREIGN PATENTS

| | | |
|---|---|---|
| 213,956 | Great Britain | Apr. 7, 1924 |
| 634,855 | France | Dec. 9, 1927 |
| 675,623 | Great Britain | July 16, 1952 |